(12) United States Patent
Chhabra

(10) Patent No.: US 8,429,729 B1
(45) Date of Patent: Apr. 23, 2013

(54) SECURE WIRELESS NETWORK SETUP USING MULTICAST PACKETS

(75) Inventor: Kapil Chhabra, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 976 days.

(21) Appl. No.: 12/177,534

(22) Filed: Jul. 22, 2008

Related U.S. Application Data

(60) Provisional application No. 60/952,988, filed on Jul. 31, 2007.

(51) Int. Cl.
*G06F 7/04* (2006.01)
(52) U.S. Cl.
USPC .................. 726/7; 370/338; 709/245; 726/4
(58) Field of Classification Search ............... 726/7, 4; 370/338; 709/245
See application file for complete search history.

(56) References Cited

U.S. PATENT DOCUMENTS

| | | | |
|---|---|---|---|
| 2005/0055461 A1* | 3/2005 | Murthy et al. | 709/245 |
| 2005/0062998 A1* | 3/2005 | Kumashio | 358/1.14 |
| 2006/0153156 A1* | 7/2006 | Wentink et al. | 370/338 |
| 2006/0282885 A1* | 12/2006 | Combs et al. | 726/5 |
| 2009/0303902 A1* | 12/2009 | Liu et al. | 370/254 |

OTHER PUBLICATIONS

Newton's Telecom Dictionary. 20th Edition. Pub 2004. p. 120.*
ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; Aug. 20, 1999; 531 pages.
IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.
IEEE 802.11n; IEEE 802.11-04/0889r6; IEEE P802.11 Wireless LANs; TGn Sync Proposal Technical Specification; Syed Aon Mujtaba; Agere Systems Inc.; May 18, 2005; 131 pages.

(Continued)

*Primary Examiner* — Krista Zele
*Assistant Examiner* — James Forman

(57) ABSTRACT

An apparatus includes a receiver circuit, a key module, and a decryption module. The receiver circuit is configured to receive a first wireless packet from a wireless access point. The first wireless packet includes (i) a destination address and (ii) a payload. The destination address is a multicast media access control (MAC) address. The multicast MAC address includes at least a portion of an encrypted wireless network security string. The key module is configured to (i) decrypt the encrypted wireless network security string using a device key of the apparatus and (ii) produce a wireless network security key in response to the decrypted wireless network security string. The decryption module is configured to decrypt payloads of packets from the wireless access point using the wireless network security key.

18 Claims, 9 Drawing Sheets

OTHER PUBLICATIONS

IEEE Std 802.11a-1999 (Supplement to IEEE Std 802.Nov. 1999); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band; LAN/MAN Standards Committee of the IEEE Computer Society; Sep. 16, 1999; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

\* cited by examiner

SECURE WIRELESS NETWORK SETUP USING MULTICAST PACKETS

CROSS-REFERENCE TO RELATED APPLICATIONS

This application claims the benefit of U.S. Provisional Patent Application Ser. No. 60/952,988, filed on Jul. 31, 2007, the disclosure thereof incorporated by reference herein in its entirety.

BACKGROUND

The present disclosure relates generally to data communication networks. More particularly, the present disclosure relates to secure wireless network setup using multicast packets.

Wireless local-area networks (WLAN) are proliferating. Compared to wired local-area networks, WLANs of course have the advantage of being wireless, enabling setup without the time-consuming task of running cables to each station in the network. But wireless communications must be secured to prevent access by unauthorized parties. Popular technologies for securing WLANs include shared secret key cryptographic schemes such as Wired Equivalent Privacy/Wireless Encryption Protocol (WEP), Wi-Fi Protected Access (WPA), and the like. According to these schemes, the stations in a WLAN share a secret key, and the wireless messages exchanged among the stations are encrypted using the shared secret key.

One complication with these schemes is the need to provide the shared secret key to each station in the WLAN. The key cannot be transmitted unencrypted over the WLAN because unauthorized parties could intercept the key, thereby gaining access to subsequent encrypted messages exchanged over the WLAN.

One conventional solution is to connect each station by a cable to a personal computer (PC), and to use the PC to provide the shared secret key to the stations over the cable. Of course, this requires physically moving each station to the PC or running a long cable between each station and the PC. In addition, the user must have the technical knowledge and patience to configure each station, for example by entering the key and Basic Service Set Identifier (BSSID) for the WLAN.

SUMMARY

In general, in one aspect, an embodiment features an apparatus comprising: a receiver adapted to receive a first wireless signal, wherein the first wireless signal includes a multicast media access control (MAC) destination address, and wherein the multicast MAC destination address includes at least a portion of an encrypted wireless network security string; and a key module adapted to produce a wireless network security key based on the encrypted wireless network security string.

Embodiments of the apparatus can include one or more of the following features. Some embodiments comprise an encryption module adapted to encrypt a payload with the wireless network security key; and a transmitter adapted to transmit a second wireless signal, wherein the second wireless signal includes the encrypted payload. Some embodiments comprise a decryption module adapted to decrypt an encrypted payload with the wireless network security key, wherein the payload is received by the receiver as part of a second wireless signal. In some embodiments, the encrypted wireless network security string is encrypted with a device key; and wherein the key module decrypts the encrypted wireless network security string using the device key. In some embodiments, the wireless network security string includes the wireless network security key. In some embodiments, the key module generates the wireless network security key based on the wireless network security string. In some embodiments, the device key includes at least one of: at least a portion of a serial number of the apparatus; and at least a portion of a MAC address of the apparatus. Some embodiments comprise a wireless network device comprising the apparatus. In some embodiments, the first wireless signal and the wireless network security key are compliant with all or part of IEEE standard 802.11, including draft and approved amendments 802.11a, 802.11b, 802.11g, and 802.11n.

In general, in one aspect, an embodiment features an apparatus comprising: receiver means for receiving a first wireless signal, wherein the first wireless signal includes a multicast media access control (MAC) destination address, and wherein the multicast MAC destination address includes at least a portion of an encrypted wireless network security string; and key means for producing a wireless network security key based on the encrypted wireless network security string.

Embodiments of the apparatus can include one or more of the following features. Some embodiments comprise encryption means for encrypting a payload with the wireless network security key; and transmitter means for transmitting a second wireless signal, wherein the second wireless signal includes the encrypted payload. Some embodiments comprise decryption means for decrypting an encrypted payload with the wireless network security key, wherein the payload is received by the receiver as part of a second wireless signal. In some embodiments, the encrypted wireless network security string is encrypted with a device key; and wherein the key means decrypts the encrypted wireless network security string using the device key. In some embodiments, the wireless network security string includes the wireless network security key. In some embodiments, the key means generates the wireless network security key based on the wireless network security string. In some embodiments, the device key includes at least one of at least a portion of a serial number of the apparatus; and at least a portion of a MAC address of the apparatus. Some embodiments comprise a wireless network device comprising the apparatus. In some embodiments, the first wireless and the wireless network security key are compliant with all or part of IEEE standard 802.11, including draft and approved amendments 802.11a, 802.11b, 802.11g, and 802.11n.

In general, in one aspect, an embodiment features a method comprising: retrieving a packet of data wherein the packet includes a multicast media access control (MAC) destination address, and wherein the multicast MAC destination address includes at least a portion of an encrypted wireless network security string; and producing a wireless network security key based on the encrypted wireless network security string.

Embodiments of the method can include one or more of the following features. Some embodiments comprise encrypting a payload with the wireless network security key; and transmitting a wireless signal, wherein the wireless signal includes the encrypted payload. Some embodiments comprise decrypting an encrypted payload with the wireless network security key, wherein the payload is received as part of a wireless signal. In some embodiments, the encrypted wireless network security string is encrypted with a device key; and wherein producing a wireless network security key includes decrypting the encrypted wireless network security string using the device key. In some embodiments, the wireless network security string includes the wireless network security key. In some embodiments, producing a wireless network security key includes generating the wireless network security key based on the wireless network security string. In some embodiments, the device key includes at least one of at least a portion of a serial number of an apparatus comprising the processor; and at least a portion of a MAC address of the apparatus. In some embodiments, the wireless network security key is compliant with all or part of IEEE standard 802.11, including draft and approved amendments 802.11a, 802.11b, 802.11g, and 802.11n.

In general, in one aspect, an embodiment features a computer program executable on a processor, comprising: instructions for retrieving a packet of data wherein the packet includes a multicast media access control (MAC) destination address, and wherein the multicast MAC destination address includes at least a portion of an encrypted wireless network security string; and instructions for producing a wireless network security key based on the encrypted wireless network security string.

Embodiments of the computer program can include one or more of the following features. Some embodiments comprise instructions for encrypting a payload with the wireless network security key; and instructions for causing transmission of a wireless signal, wherein the wireless signal includes the encrypted payload. Some embodiments comprise instructions for decrypting an encrypted payload with the wireless network security key, wherein the payload is received as part of a wireless signal. In some embodiments, the encrypted wireless network security string is encrypted with a device key; and wherein the instructions for producing a wireless network security key include instructions for decrypting the encrypted wireless network security string using the device key. In some embodiments, the wireless network security string includes the wireless network security key. In some embodiments, the instructions for producing a wireless network security key include instructions for generating the wireless network security key based on the wireless network security string. In some embodiments, the device key includes at least one of: at least a portion of a serial number of an apparatus comprising the processor; and at least a portion of a MAC address of the apparatus. In some embodiments, the wireless network security key is compliant with all or part of IEEE standard 802.11, including draft and approved amendments 802.11a, 802.11b, 802.11g, and 802.11n.

In general, in one aspect, an embodiment features an apparatus comprising: an input module adapted to receive a wireless network security string and a device key; a processor adapted to encrypt the wireless network security string with the device key; a transmitter adapted to transmit a signal, wherein the signal includes a multicast media access control (MAC) destination address, and wherein the multicast MAC destination address includes at least a portion of the encrypted wireless network security string.

Embodiments of the apparatus can include one or more of the following features. In some embodiments, the wireless network security string includes a wireless network security key. In some embodiments, a wireless network security key is generated based on the wireless network security string. In some embodiments, the device key includes at least one of at least a portion of a serial number of a wireless network device; and at least a portion of a MAC address of the wireless network device. Some embodiments comprise a computer comprising the apparatus. In some embodiments, the wireless network security key is compliant with all or part of IEEE standard 802.11, including draft and approved amendments 802.11a, 802.11b, 802.11g, and 802.11n.

In general, in one aspect, an embodiment features an apparatus comprising: input means for receiving a wireless network security string and a device key; processor means for encrypting the wireless network security string with the device key; transmitter means for transmitting a signal, wherein the signal includes a multicast media access control (MAC) destination address, and wherein the multicast MAC destination address includes at least a portion of the encrypted wireless network security string.

Embodiments of the apparatus can include one or more of the following features. In some embodiments, the wireless network security string includes a wireless network security key. In some embodiments, a wireless network security key is generated based on the wireless network security string. In some embodiments, the device key includes at least one of: at least a portion of a serial number of a wireless network device; and at least a portion of a MAC address of the wireless network device. Some embodiments comprise a computer comprising the apparatus. In some embodiments, the wireless network security key is compliant with all or part of IEEE standard 802.11, including draft and approved amendments 802.11a, 802.11b, 802.11g, and 802.11n.

In general, in one aspect, an embodiment features a method comprising: receiving a wireless network security string and a device key; encrypting the wireless network security string with the device key; and transmitting of a signal, wherein the signal includes a multicast media access control (MAC) destination address, and wherein the multicast MAC destination address includes at least a portion of the encrypted wireless network security string.

Embodiments of the method can include one or more of the following features. In some embodiments, the wireless network security string includes a wireless network security key. In some embodiments, a wireless network security key is generated based on the wireless network security string. In some embodiments, the device key includes at least one of: at least a portion of a serial number of a wireless network device; and at least a portion of a MAC address of the wireless network device. In some embodiments, the wireless network security key is compliant with all or part of IEEE standard 802.11, including draft and approved amendments 802.11a, 802.11b, 802.11g, and 802.11n.

In general, in one aspect, an embodiment features a computer program comprising: instructions for receiving a wireless network security string and a device key; instructions for encrypting the wireless network security string with the device key; and instructions for causing transmission of a signal, wherein the signal includes a multicast media access control (MAC) destination address, and wherein the multicast MAC destination address includes at least a portion of the encrypted wireless network security string.

Embodiments of the computer program can include one or more of the following features. In some embodiments, the wireless network security string includes a wireless network security key. In some embodiments, a wireless network security key is generated based on the wireless network security string. In some embodiments, the device key includes at least one of: at least a portion of a serial number of a wireless network device; and at least a portion of a MAC address of the wireless network device. In some embodiments, the wireless network security key is compliant with all or part of IEEE standard 802.11, including draft and approved amendments 802.11a, 802.11b, 802.11g, and 802.11n.

In general, in one aspect, an embodiment features a signal representing a packet of data, wherein the packet comprises: a payload; and a packet header, wherein the packet header includes a multicast media access control (MAC) destination address, and wherein the multicast MAC destination address includes at least a portion of an encrypted wireless network security string.

Embodiments of the signal can include one or more of the following features. In some embodiments, the wireless network security string includes a wireless network security key. In some embodiments, a wireless network security key is generated based on the wireless network security string. In some embodiments, the device key includes at least one of: at least a portion of a serial number of a wireless network device; and at least a portion of a MAC address of the wireless network device. Some embodiments comprise a computer-readable medium embodying the signal. Some embodiments comprise a waveform embodying the signal. In some embodiments, the signal and the wireless network security key are compliant with all or part of IEEE standard 802.11, including draft and approved amendments 802.11a, 802.11b, 802.11g, and 802.11n.

The details of one or more implementations are set forth in the accompanying drawings and the description below. Other features will be apparent from the description and drawings, and from the claims.

Figure 1:
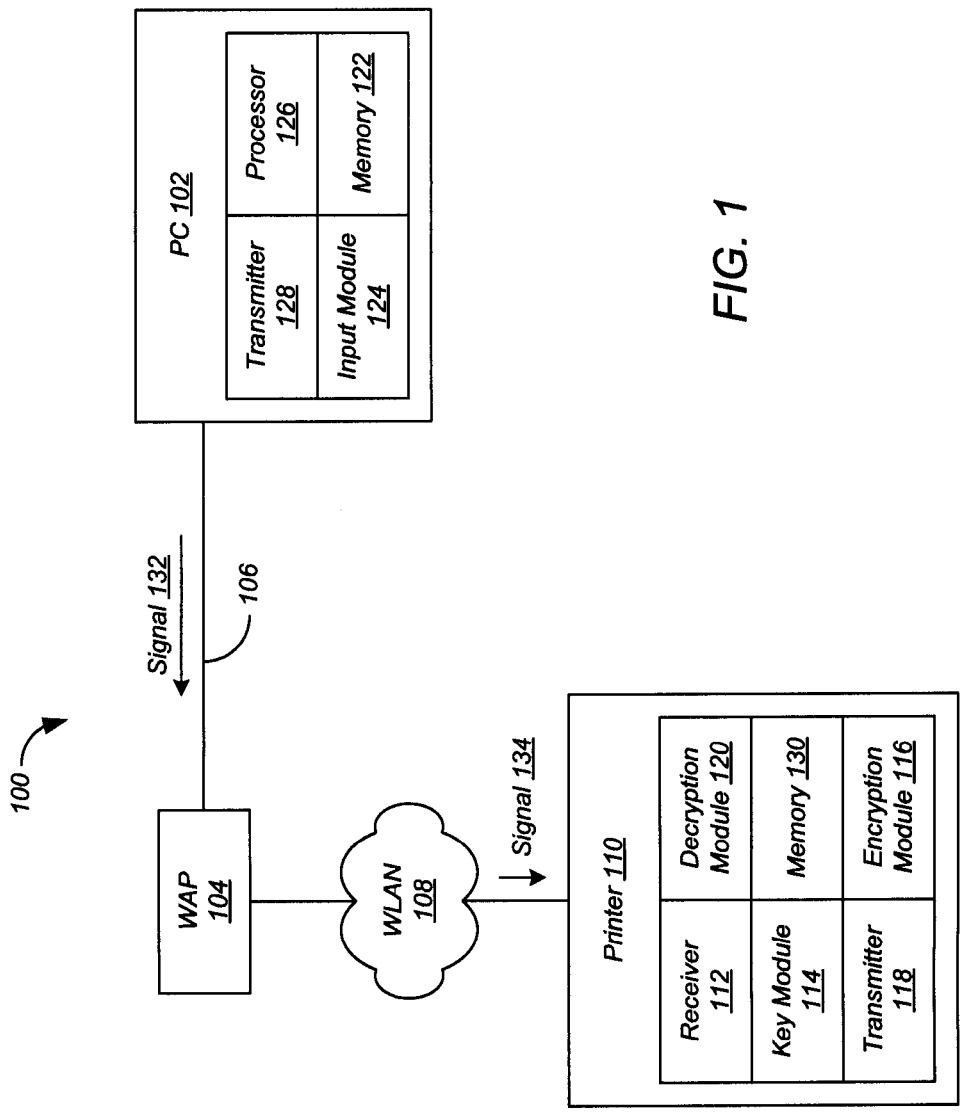
FIG. 1 shows a data communication system including a personal computer (PC) connected to a secure wireless access point (WAP) by a wired link.

The leading digit(s) of each reference numeral used in this specification indicates the number of the drawing in which the reference numeral first appears.

DETAILED DESCRIPTION

Embodiments described herein are directed to apparatus, methods, and computer programs for secure wireless network setup using multicast packets. These embodiments are described in terms of IEEE 802.11 networks. However, this description is not intended to limit the application of the example embodiments presented herein. It will be apparent to one skilled in the relevant arts based on the disclosure and teachings provided herein how to implement the following example embodiments in alternative embodiments.

FIG. 1 shows a data communication system 100 including a personal computer (PC) 102 connected to a secure wireless access point (WAP) 104 by a wired link 106. Wired link 106 can be implemented as an Ethernet connection and the like. Although in the described embodiments, the elements of data communication system 100 are presented in one arrangement, other embodiments may feature other arrangements, as will be apparent to one skilled in the relevant arts based on the disclosure and teachings provided herein. For example, the elements of data communication system 100 can be implemented in hardware, software, or combinations thereof.

Referring to FIG. 1, WAP 104 has established a secure WLAN 108 in infrastructure mode. WLAN 108 is secured by a shared secret key cryptographic scheme such as Wired Equivalent Privacy/Wireless Encryption Protocol (WEP), Wi-Fi Protected Access (WPA), WPA2, and the like. According to these schemes, the stations in a WLAN share a secret key, and the wireless messages exchanged among the stations are encrypted using the shared secret key.

A user of PC 102 seeks to add an IEEE 802.11 enabled printer 110 to secure WLAN 108. Of course, this description is not limited to printers, but applies to any sort of IEEE 802.11 enabled device such as scanners, cameras, other consumer electronics devices, and the like.

Printer 110 includes a receiver 112 adapted to receive wireless signals such as those generated by WAP 104. Printer 110 also includes a key module 114 adapted to generate a wireless network security key based on an encrypted wireless network security string received in the wireless signals. The wireless signals and the wireless network security key can be compliant with all or part of IEEE standard 802.11, including draft and approved amendments 802.11a, 802.11b, 802.11g, and 802.11n.

The wireless network security string can be encrypted with a device key. Key module 114 can decrypt the encrypted wireless network security string using the device key. The device key can include a serial number of printer 110, a MAC address of printer 110, and the like. In some embodiments, the wireless network security string includes the wireless network security key. In other embodiments, the wireless network security string includes a passphrase that key module 114 uses to generate the wireless network security key, for example based on a conventional key generation algorithm such as described in the IEEE 802.11 standard.

Printer 110 also includes an encryption module 116 adapted to encrypt a payload with the wireless network security key, and a transmitter 118 adapted to transmit wireless signals which can include the encrypted payload. Receiver 112 can receive wireless signals from WAP 104 that include payloads encrypted with the wireless network security key. Therefore printer 110 also includes a decryption module 120 adapted to decrypt the encrypted payloads using the wireless network security key. Printer 110 also includes a memory 130.

PC 102 includes a memory 122 and an input module 124 adapted to receive the wireless network security string and the device key. PC 102 also includes a processor 126 adapted to encrypt the wireless network security string with the device key. PC 102 also includes a transmitter 128 adapted to transmit signals 132 that each include at least a portion of the encrypted wireless network security string.

Figure 2:
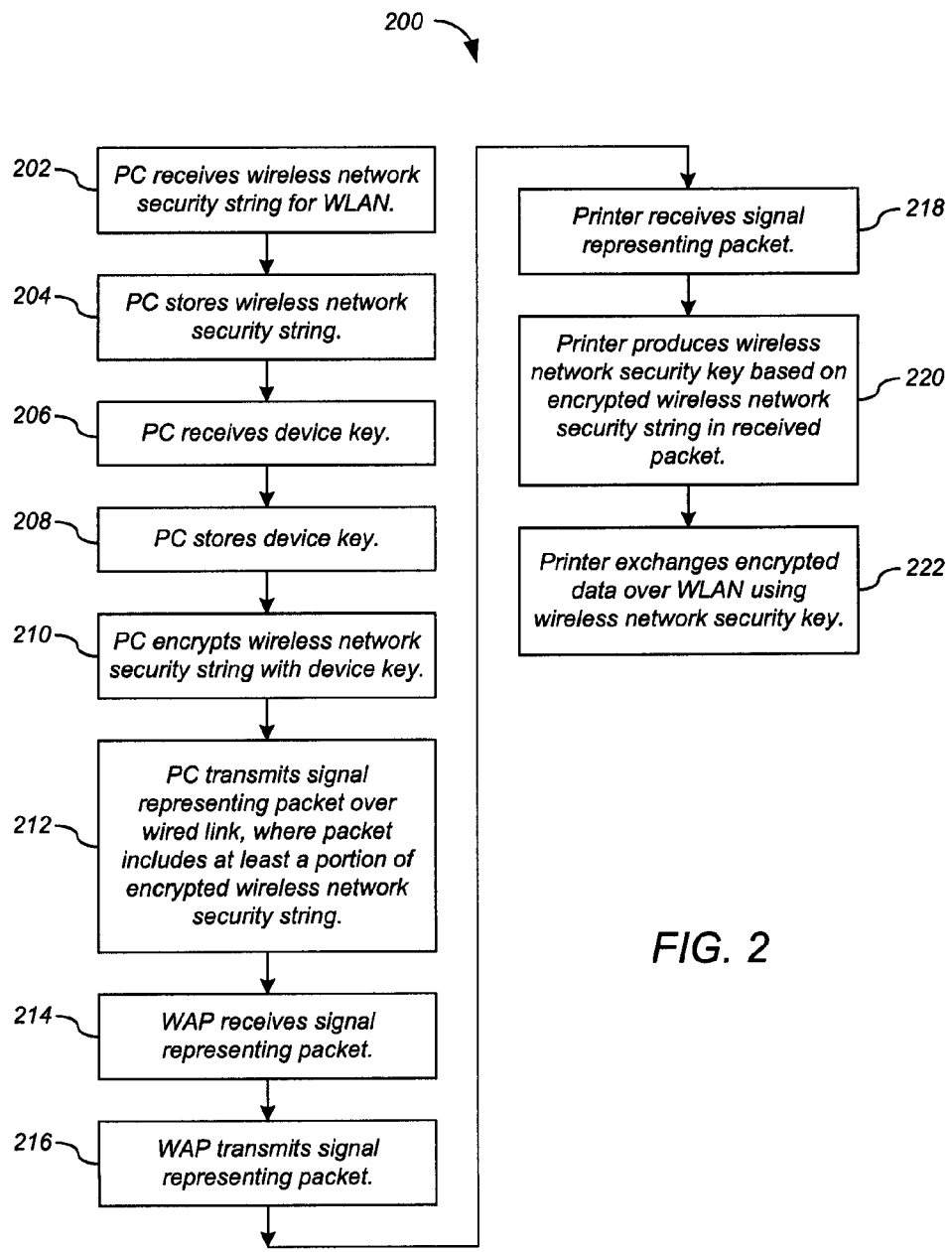
FIG. 2 shows a process for the data communication system of FIG. 1 according to one embodiment.

FIG. 2 shows a process 200 for data communication system 100 of FIG. 1 according to one embodiment. Although in the described embodiments, the elements of process 200 are presented in one arrangement, other embodiments may feature other arrangements, as will be apparent to one skilled in the relevant arts based on the disclosure and teachings provided herein. For example, in various embodiments, some or all of the steps of process 200 can be executed in a different order, concurrently, and the like.

Input module 124 of PC 102 receives a wireless network security string for WLAN 108 (step 202). For example, a user can enter the wireless network security string using a PC keyboard. In some embodiments, the wireless network security string includes the wireless network security key. In other embodiments, the wireless network security string includes a passphrase that can be used to generate the wireless network security key. PC 102 stores the wireless network security string in memory 122 (step 204).

Input module 124 of PC 102 also receives a device key for printer 110 (step 206). The device key can include all or part of a serial number of printer 110, a MAC address of printer 110, and the like. For example, a user of PC 102 can install setup software provided with printer 110. The device key can be encoded in the setup software, printed on a disk containing the setup software or a label or manual accompanying the setup software, and the like. PC 102 stores the wireless network security string in memory 122 (step 208).

Processor 126 of PC 102 encrypts the wireless network security string with the device key (step 210). The cryptographic schemes used to encrypt the wireless network security string with the device key can include WEP, WPA, WPA2, and the like. Transmitter 128 transmits a signal 132 representing a packet of data over wired link 106, where the packet includes at least a portion of the encrypted wireless network security string (step 212). In embodiments where the encrypted wireless network security string is so large that multiple packets are required, sequence numbers are used to identify the portions transmitted.

Signal 132 can be embodied in a computer-readable medium such as memory 122 of PC 102 and memory 130 of printer 110. Signal 132 can also be embodied in a waveform such as a waveform traversing wired link 106 or WLAN 108. When traversing WLAN 108, signal 132 can be compliant with all or part of IEEE standard 802.11, including draft and approved amendments 802.11a, 802.11b, 802.11g, and 802.11n.

Figure 3:
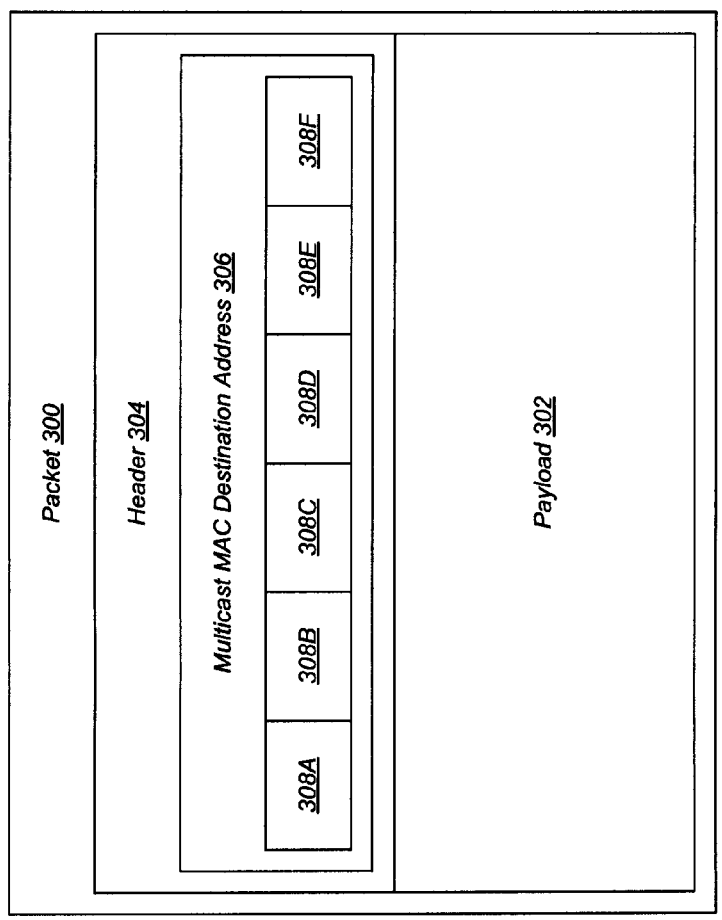
FIG. 3 shows a packet according to one embodiment.

FIG. 3 shows a packet 300 that can be represented by signal 132 according to one embodiment. Packet 300 includes a payload 302 and a header 304. Header 304 includes a multicast media access control (MAC) destination address 306. Multicast MAC destination address 306 includes at least a portion of the encrypted wireless network security string.

In some embodiments, multicast MAC destination address 306 includes 6 bytes 308A-308F. The first byte 308A includes a 6-bit organization identifier (OD, which can represent a manufacturer of all or part of receiver 112 of printer 110. For example, the OI can identify a manufacturer of a communication chip in receiver 112.

The second byte 308B includes a sequence number SN, which is used when the encrypted wireless network security string is too large to fit in a single multicast MAC destination address 306, and so is broken into multiple parts, each identified by a respective sequence number SN and included in a respective multicast MAC destination address 306.

The third through sixth bytes 308C-308F include at least a portion of the encrypted wireless network security string. For example, an embodiment using a 128-bit encrypted wireless network security string requires 4 packets 300 where bytes 308C-308F of each packet 300 include 4 bytes of the 128-bit encrypted wireless network security string.

Referring again to FIG. 2, WAP 104 receives signal 132 representing packet 300 (step 214). Because packet 300 has a multicast MAC destination address, WAP 104 transmits a wireless signal 134 representing packet 300 over WLAN 108 (step 216).

Receiver 112 of printer 110 receives signal 134 (step 218). During setup, receiver 112 operates in promiscuous mode, receiving all packets transmitted by WAP 104. For example, receiver 112 can enter promiscuous mode in response to a user pressing a setup button on a control panel of printer 110.

Key module 114 of printer 110 produces a wireless network security key based on the encrypted wireless network security string in the received packet (step 220). In embodiments where multiple packets 300 are needed to transfer the encrypted wireless network security string, key module 114 assembles the encrypted wireless network security string based on the sequence numbers SN in the packets 300.

In particular, key module 114 decrypts the encrypted wireless network security string using the device key, which is stored in memory 130. For example, the device key can be burned into a read-only memory by the manufacturer of printer 110. In some embodiments the wireless network security string includes the wireless network security key. In other embodiments, the wireless network security string includes a passphrase. In such embodiments key module 114 generates the wireless network security key based on the passphrase, for example based on a conventional key generation algorithm such as described in the IEEE 802.11 standard.

Printer 110 subsequently exchanges encrypted data over WLAN 108 using the wireless network security key (step 222). To transmit a payload of data, encryption module 116 of printer 110 encrypts the payload with the wireless network security key, and transmitter 118 transmits a wireless signal that includes the encrypted payload. To receive a payload of data, receiver 112 receives a wireless signal that includes an encrypted payload, and decryption module 120 decrypts the encrypted payload with the wireless network security key.

Figure 4:
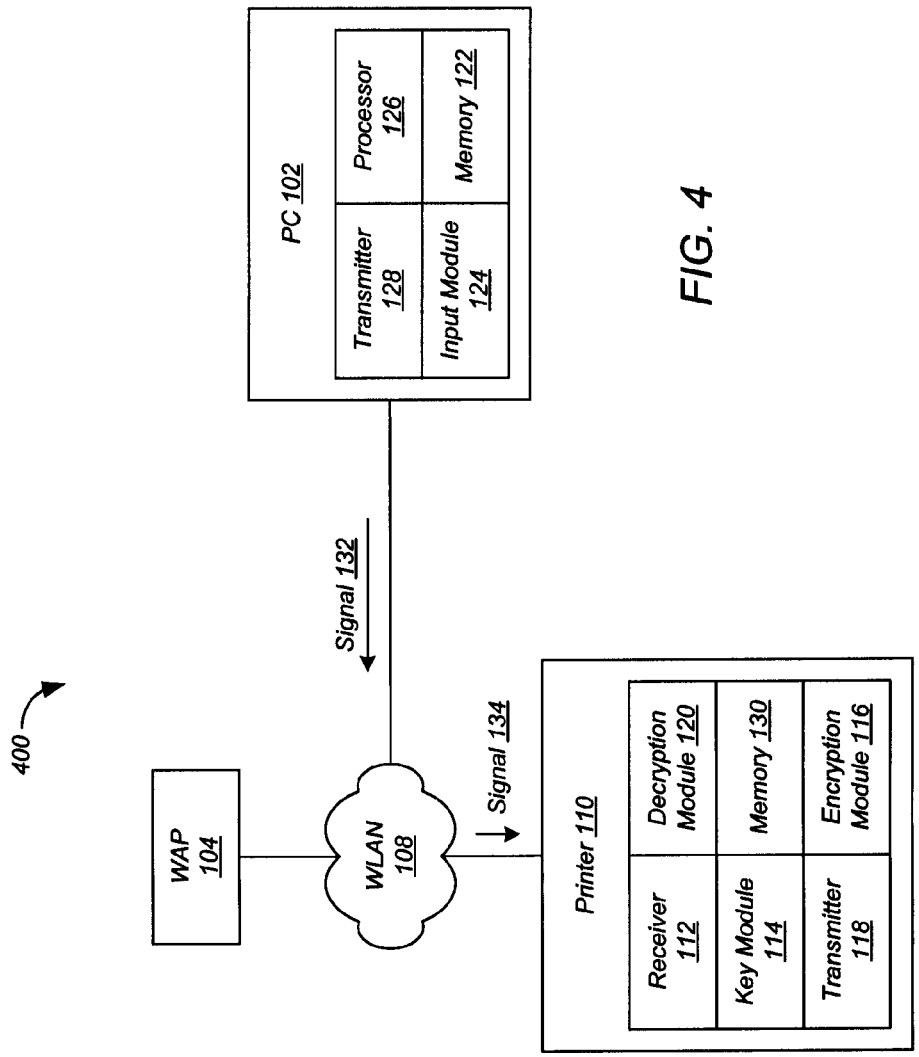
FIG. 4 shows a data communication system including a PC connected to a WAP over a wireless local-area network (WLAN).

In some embodiments, PC 102 connects to WAP 104 over WLAN 108. FIG. 4 shows such a data communication system 400. In such embodiments, process 200 of FIG. 2 can be used with the modification that in step 212, transmitter 128 transmits the signal 132 representing the packet of data over WLAN 108 rather than over wired link 106. In some of these embodiments, receiver 112 of printer 110 can receive signals 132 directly from PC 102 instead of, or in addition to, receiving signals 134 from WAP 104.

Figure 5:
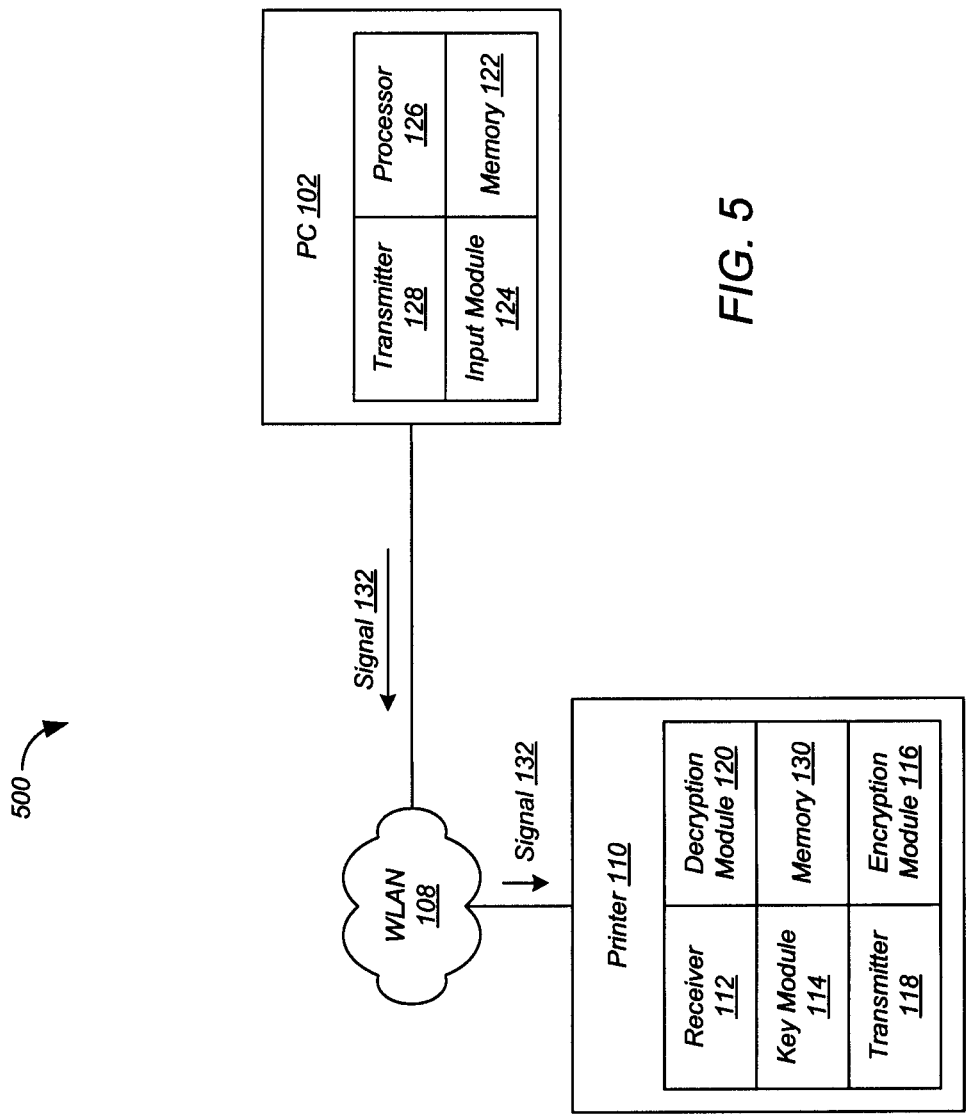
FIG. 5 shows a data communication system including a PC communicating over a WLAN in peer-to-peer mode.

In some embodiments, PC 102 communicates over WLAN 108 in peer-to-peer mode, rather than in infrastructure mode, rendering wired link 106, WAP 104, and the signals 134 transmitted by WAP 104, unnecessary. In these embodiments, WLAN 108 can be established by PC 102. FIG. 5 shows such a data communication system 500. In such embodiments, process 200 of FIG. 2 can be used with the modifications now described. In step 212, transmitter 128 transmits the signal 132 representing the packet of data over WLAN 108 rather than over wired link 106. Steps 214 and 216 are eliminated. In step 218, receiver 112 of printer 110 receives signal 132 rather than signal 134.

Figure 6:
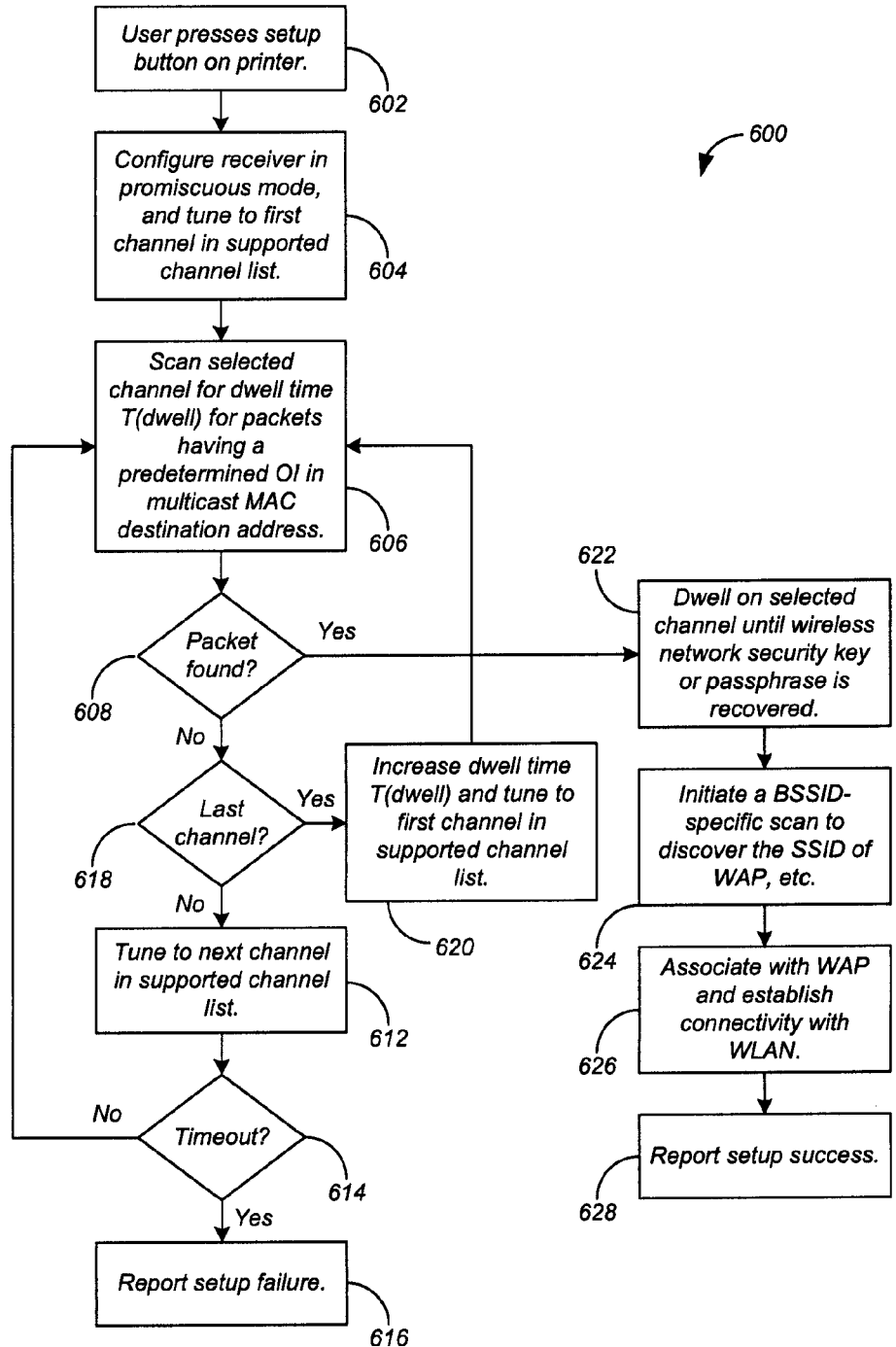
FIG. 6 shows a process for the printer of FIG. 1 according to one embodiment.

FIG. 6 shows a process 600 for printer 110 of FIG. 1 according to one embodiment. Of course, this description is not limited to printers, but applies to any sort of IEEE 802.11 enabled device such as scanners, cameras, other consumer electronics devices, and the like. While process 600 is described for a WLAN 108 in infrastructure mode, process 600 is readily adapted to peer-to-peer mode, as will be apparent to one skilled in the relevant arts based on the disclosure and teachings provided herein.

Although in the described embodiments, the elements of process 600 are presented in one arrangement, other embodiments may feature other arrangements, as will be apparent to one skilled in the relevant arts based on the disclosure and teachings provided herein. For example, in various embodiments, some or all of the steps of process 600 can be executed in a different order, concurrently, and the like.

Referring to FIG. 6, a user presses a setup button on printer 110 (step 602). In response, printer 110 configures receiver 112 in promiscuous mode, and tunes to the first channel in the supported channel list (step 604).

Receiver 112 scans the selected channel for a dwell time T(dwell) for packets having a predetermined 6-bit organization identifier (OI) in the multicast MAC destination address (step 606). The predetermined OI can be stored in memory 130. For example, the predetermined OI can be burned into read-only memory by the manufacturer of printer 110. As another example, the predetermined OI can be burned into a read-only memory of a communication chip in receiver 112 by the manufacturer of the communication chip.

PC 102 can transmit signals 132 at least once a second. Dwell time T(dwell) can be approximately 1 second. If no such packet is found during dwell time T(dwell) (step 608), receiver 112 tunes to the next channel in the supported channel list (step 612), and if the secure setup timeout has not expired (step 614), continues scanning (returning to step 606). But if the secure setup timeout has expired (step 614), printer 110 ends process 600 and reports setup failure (step 616), for example by an indication on a control panel of printer 110.

If all of the channels in the supported channel list are scanned without detecting a packet having the predetermined 6-bit OI in the multicast MAC destination address (step 618), receiver 112 increases dwell time T(dwell) by a predetermined amount of time (step 620), and scans the channels again (returning to step 606).

When receiver 112 detects a packet having the predetermined 6-bit organization identifier (OI) in its multicast MAC destination address (step 608), receiver 112 continues to dwell on the selected channel until the wireless network security key or passphrase is recovered using the device key (step 622). As described above, this may require reception of multiple packets. Printer 110 also learns the BSSID of WAP 104 from the packets.

Printer 110 then initiates a BSSID-specific scan to discover the SSID of WAP 104, as well as other network information such as supported rates, security parameters, and the like, from beacons/probe responses (step 624). Printer 110 stores this information, along with the wireless network security key or passphrase, in memory 130.

Printer 110 then associates with WAP 104, and establishes connectivity with

WLAN 108 (step 626). Printer 110 then ends process 600 and reports setup success (step 628), for example by an indication on a control panel of printer 110.

Figure 7B:
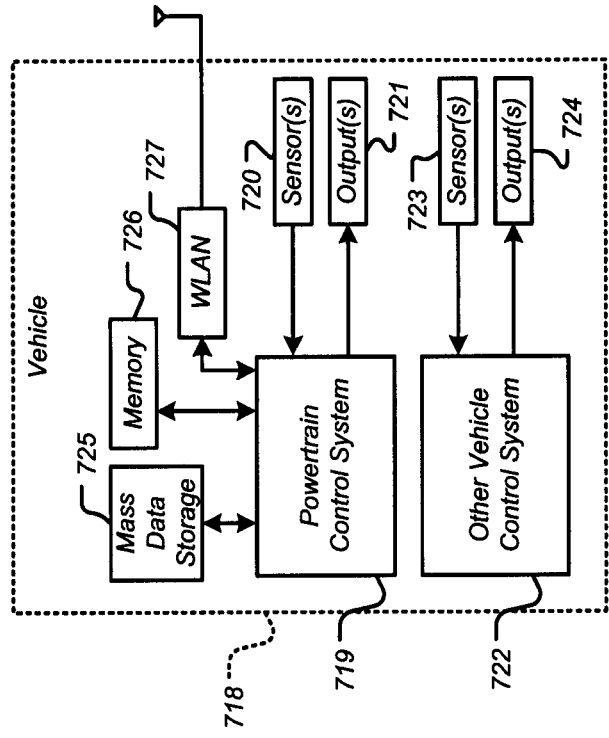
FIGS. 7A-7E show various exemplary implementations.
Figure 7A:
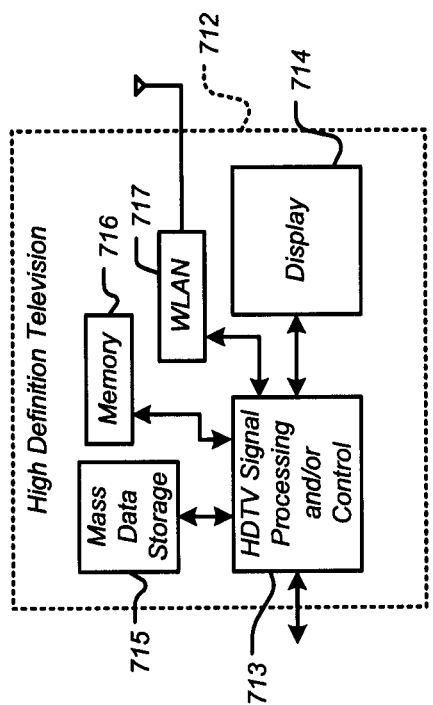

FIGS. 7A-7E show various exemplary implementations. Referring now to FIG. 7A, an embodiment can be implemented in a high definition television (HDTV) 712. An embodiment may implement either or both signal processing and/or control circuits, which are generally identified in FIG. 7A at 713, a WLAN interface 717 and/or mass data storage 715 of the HDTV 712. The HDTV 712 receives HDTV input signals in either a wired or wireless format and generates HDTV output signals for a display 714. In some implementations, signal processing circuit and/or control circuit 713 and/or other circuits (not shown) of the HDTV 712 may process data, perform coding and/or encryption, perform calculations, format data and/or perform any other type of HDTV processing that may be required.

The HDTV 712 may communicate with mass data storage 715 that stores data in a nonvolatile manner such as optical and/or magnetic storage devices. The HDD may be a mini HDD that includes one or more platters having a diameter that is smaller than approximately 1.8". The HDTV 712 may be connected to memory 716 such as RAM, ROM, nonvolatile memory such as flash memory and/or other suitable electronic data storage. The HDTV 712 also may support connections with a WLAN via a WLAN network interface 717.

Referring now to FIG. 7B, an embodiment implements a control system of a vehicle 718, a WLAN interface 727 and/or mass data storage 725 of the vehicle control system. In some implementations, an embodiment implements a powertrain control system 719 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

An embodiment may also be implemented in other control systems 722 of the vehicle 718. The control system 722 may likewise receive signals from input sensors 723 and/or output control signals to one or more output devices 724. In some implementations, the control system 722 may be part of an anti-lock braking system (ABS), a navigation system, a telematics system, a vehicle telematics system, a lane departure system, an adaptive cruise control system, a vehicle entertainment system such as a stereo, DVD drive, compact disc system and the like. Still other implementations are contemplated.

The powertrain control system 719 may communicate with mass data storage 725 that stores data in a nonvolatile manner. The mass data storage 725 may include optical and/or magnetic storage devices including HDDs and/or DVD drives. The HDD may be a mini HDD that includes one or more platters having a diameter that is smaller than approximately 1.8". The powertrain control system 719 may be connected to memory 726 such as RAM, ROM, nonvolatile memory such as flash memory and/or other suitable electronic data storage. The powertrain control system 719 also may support connections with a WLAN via a WLAN network interface 727. The control system 722 may also include mass data storage, memory and/or a WLAN interface (all not shown).

Figure 7C:
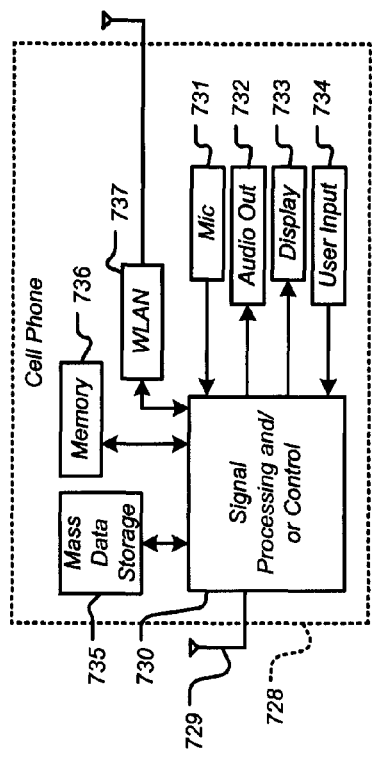

Referring now to FIG. 7C, an embodiment can be implemented in a cellular phone 728 that may include a cellular antenna 729. An embodiment may implement either or both signal processing and/or control circuits, which are generally identified in FIG. 7C at 730, a WLAN interface 737 and/or mass data storage 735 of the cellular phone 728. In some implementations, the cellular phone 728 includes a microphone 731, an audio output 732 such as a speaker and/or audio output jack, a display 733 and/or user input device 734 such as a keypad, pointing device, and/or voice actuation, for example. The signal processing and/or control circuits 730 and/or other circuits (not shown) in the cellular phone 728 may process data, perform coding and/or encryption, perform calculations, format data and/or perform other cellular phone functions.

The cellular phone 728 may communicate with mass data storage 735 that stores data in a nonvolatile manner such as optical and/or magnetic storage devices including HDDs and/or DVD drives. The HDD may be a mini HDD that includes one or more platters having a diameter that is smaller than approximately 1.8". The cellular phone 728 may be connected to memory 736 such as RAM, ROM, nonvolatile memory such as flash memory and/or other suitable electronic data storage. The cellular phone 728 also may support connections with a WLAN via a WLAN network interface 737.

Figure 7D:
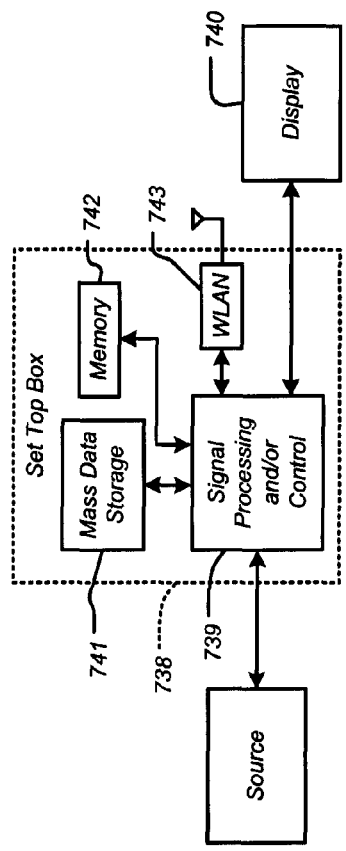

Referring now to FIG. 7D, an embodiment can be implemented in a set top box 738. An embodiment may implement either or both signal processing and/or control circuits, which are generally identified in FIG. 7D at 739, a WLAN interface 743 and/or mass data storage 741 of the set top box 738. The set top box 738 receives signals from a source such as a broadband source and outputs standard and/or high definition audio/video signals suitable for a display 740 such as a television, a monitor and/or other video and/or audio output devices. The signal processing and/or control circuits 739 and/or other circuits (not shown) of the set top box 738 may process data, perform coding and/or encryption, perform calculations, format data and/or perform any other set top box functions.

The set top box 738 may communicate with mass data storage 743 that stores data in a nonvolatile manner. The mass data storage 743 may include optical and/or magnetic storage devices including HDDs and/or DVD drives. The HDD may be a mini HDD that includes one or more platters having a diameter that is smaller than approximately 1.8". The set top box 738 may be connected to memory 742 such as RAM, ROM, nonvolatile memory such as flash memory and/or other suitable electronic data storage. The set top box 738 also may support connections with a WLAN via a WLAN network interface 743.

Figure 7E:
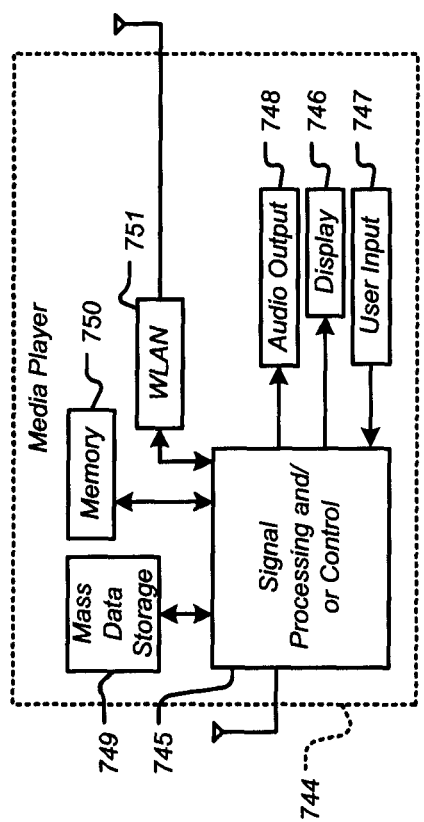

Referring now to FIG. 7E, an embodiment can be implemented in a media player 744. An embodiment may implement either or both signal processing and/or control circuits, which are generally identified in FIG. 7E at 745, a WLAN interface 751 and/or mass data storage 749 of the media player 744. In some implementations, the media player 744 includes a display 746 and/or a user input 747 such as a keypad, touchpad and the like. In some implementations, the media player 744 may employ a graphical user interface (GUI) that typically employs menus, drop down menus, icons and/or a point-and-click interface via the display 746 and/or user input 747. The media player 744 further includes an audio output 748 such as a speaker and/or audio output jack. The signal processing and/or control circuits 745 and/or other circuits (not shown) of the media player 744 may process data, perform coding and/or encryption, perform calculations, format data and/or perform any other media player functions.

The media player 744 may communicate with mass data storage 749 that stores data such as compressed audio and/or video content in a nonvolatile manner. In some implementations, the compressed audio files include files that are compliant with MP3 format or other suitable compressed audio and/or video formats. The mass data storage 749 may include optical and/or magnetic storage devices including HDDs and/or DVD drives. The HDD may be a mini HDD that includes one or more platters having a diameter that is smaller than approximately 1.8". The media player 744 may be connected to memory 750 such as RAM, ROM, low latency nonvolatile memory such as flash memory and/or other suitable electronic data storage. The media player 744 also may support connections with a WLAN via a WLAN network interface 751. Still other implementations in addition to those described above are contemplated.

Various embodiments can be implemented in digital electronic circuitry, or in computer hardware, firmware, software, or in combinations of them. Apparatus can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, it will be understood that various modifications may be made without departing from the spirit and scope of the disclosure. For example, in some cases the wireless device to be set up may not possess the computational power required to run the protocols described above. In such cases another more powerful and trusted platform or device, such as a PC or the like, can act as a proxy to negotiate the protocol and obtain the wireless network security key on behalf of the wireless device. Then the proxy can communicate the resulting key to the wireless device via a secure channel, such as a serial link (UART, USB, Ethernet, etc.), save it on a flash memory device that the user can plug into the wireless device, and the like. Accordingly, other implementations are within the scope of the following claims.

What is claimed is:

1. An apparatus comprising:
a receiver circuit configured to receive a first wireless packet from a wireless access point, wherein the first wireless packet includes (i) a destination address and (ii) a payload, wherein the destination address is a multicast media access control (MAC) address, and wherein the multicast MAC address includes at least a portion of an encrypted wireless network security string;
a key module configured to (i) decrypt the encrypted wireless network security string using a device key of the apparatus and (ii) produce a wireless network security key in response to the decrypted wireless network security string; and
a decryption module configured to decrypt payloads of packets from the wireless access point using the wireless network security key.

2. The apparatus of claim 1, further comprising:
an encryption module configured to generate a second encrypted payload by encrypting a second payload with the wireless network security key; and
a transmitter configured to transmit a second wireless packet, wherein the second wireless packet includes the second encrypted payload.

3. The apparatus of claim 1:
wherein the wireless network security string includes the wireless network security key.

4. The apparatus of claim 1, wherein the device key includes at least one of:
at least a portion of a serial number of the apparatus; and
at least a portion of a MAC address of the apparatus.

5. A wireless network device comprising the apparatus of claim 1.

6. A non-transitory tangible computer readable medium storing a computer program executable on a processor of an apparatus, the computer program comprising:

instructions for retrieving a packet of data from a wireless access point, wherein the packet includes (i) a destination address and (ii) a payload, wherein the destination address is a multicast media access control (MAC) address, and wherein the multicast MAC address includes at least a portion of an encrypted wireless network security string;

instructions for decrypting the encrypted wireless network security string using a device key of the apparatus;

instructions for producing a wireless network security key based on the decrypted wireless network security string; and instructions for decrypting payloads of packets from the wireless access point using the wireless network security key.

7. The computer program of claim 6, further comprising:

instructions for generating a second encrypted payload by encrypting a second payload with the wireless network security key; and instructions for causing transmission of a wireless packet, wherein the wireless packet includes the second encrypted payload.

8. The computer program of claim 6:

wherein the wireless network security string includes the wireless network security key.

9. The computer program of claim 6, wherein the device key includes at least one of:

at least a portion of a serial number of the apparatus; and at least a portion of a MAC address of the apparatus.

10. An apparatus comprising:

an input module configured to receive
   (i) a wireless network security string for a wireless local area network established by a wireless access point, and
   (ii) a device key of a device attempting to join the wireless local area network;

a processor configured to encrypt the wireless network security string with the device key; and a transmitter configured to transmit a packet to the device via the wireless access point, wherein the packet includes (i) a destination address and (ii) a payload, the destination address is a multicast media access control (MAC) address, and the multicast MAC address includes at least a portion of the encrypted wireless network security string.

11. The apparatus of claim 10:

wherein the wireless access point transmits packets having payloads encrypted with a wireless network security key, and wherein the wireless network security string includes the wireless network security key.

12. The apparatus of claim 10:

wherein the wireless access point transmits packets having payloads encrypted with a wireless network security key, and wherein the wireless network security key is generated based on the wireless network security string.

13. The apparatus of claim 10, wherein the device key includes at least one of:

at least a portion of a serial number of the device attempting to join the wireless local area network; and at least a portion of a MAC address of the device attempting to join the wireless local area network.

14. A computer comprising the apparatus of claim 10.

15. A non-transitory tangible computer readable medium storing a computer program executable on a processor, the computer program comprising:

instructions for receiving (i) a wireless network security string for a wireless local area network established by a wireless access point and (ii) a device key of a device attempting to join the wireless local area network;

instructions for encrypting the wireless network security string with the device key; and instructions for causing transmission of a packet to the device via the wireless access point, wherein the packet includes (i) a destination address and (ii) a payload, the destination address is a multicast media access control (MAC) address, and the multicast MAC address includes at least a portion of the encrypted wireless network security string.

16. The computer program of claim 15:

wherein the wireless access point is configured to transmit packets having payloads encrypted with a wireless network security key, and wherein the wireless network security string includes the wireless network security key.

17. The computer program of claim 15:

wherein the wireless access point is configured to transmit packets having payloads encrypted with a wireless network security key, and wherein the wireless network security key is generated based on the wireless network security string.

18. The computer program of claim 15, wherein the device key includes at least one of:

at least a portion of a serial number of the device attempting to join the wireless local area network; and at least a portion of a MAC address of the device attempting to join the wireless local area network.

* * * * *